(12) United States Patent
Sharma et al.

(10) Patent No.: US 11,270,485 B2
(45) Date of Patent: Mar. 8, 2022

(54) AUTOMATIC POSITIONING OF TEXTUAL CONTENT WITHIN DIGITAL IMAGES

(71) Applicant: Adobe Inc., San Jose, CA (US)

(72) Inventors: Mrinal Kumar Sharma, Noida (IN); Gourav Singhal, Delhi (IN)

(73) Assignee: Adobe Inc., San Jose, CA (US)

( * ) Notice: Subject to any disclaimer, the term of this patent is extended or adjusted under 35 U.S.C. 154(b) by 44 days.

(21) Appl. No.: 16/518,433

(22) Filed: Jul. 22, 2019

(65) Prior Publication Data

US 2021/0027508 A1 Jan. 28, 2021

(51) Int. Cl.
*G06T 11/60* (2006.01)
*G06K 9/00* (2006.01)
*G06F 40/166* (2020.01)
*G06V 30/414* (2022.01)

(52) U.S. Cl.
CPC ........... *G06T 11/60* (2013.01); *G06F 40/166* (2020.01); *G06V 30/414* (2022.01)

(58) Field of Classification Search
CPC .... G06T 11/60; G06F 40/166; G06K 9/00463
USPC ........................................................ 345/629
See application file for complete search history.

(56) References Cited

U.S. PATENT DOCUMENTS

| | | | |
|---|---|---|---|
| 8,482,582 B2 | 7/2013 | Gelber et al. | |
| 9,830,508 B1* | 11/2017 | Winder | G06K 9/4604 |
| 10,049,477 B1* | 8/2018 | Kokemohr | G06T 11/60 |
| 10,109,092 B1 | 10/2018 | Hitchings, Jr. | |
| 10,782,852 B1* | 9/2020 | Al Majid | G06F 3/04842 |
| 2002/0018239 A1* | 2/2002 | Ahrens | G06F 3/1284 358/1.18 |
| 2002/0073121 A1* | 6/2002 | Sano | G06F 40/166 715/255 |
| 2003/0118234 A1* | 6/2003 | Tanaka | G06K 9/00456 382/173 |
| 2005/0012760 A1* | 1/2005 | Yamamoto | G06T 11/60 345/636 |

(Continued)

OTHER PUBLICATIONS

"Restriction Requirement", U.S. Appl. No. 16/601,263, filed Aug. 27, 2020, 7 pages.

(Continued)

*Primary Examiner* — Jennifer Mehmood
*Assistant Examiner* — Kim Thanh T Tran
(74) *Attorney, Agent, or Firm* — FIG. 1 Patents

(57) ABSTRACT

Automatic positioning of textual content within digital images is leveraged in a digital medium environment. Initially, user input is received to add textual content to a digital image. A salient portion and a non-salient portion of the digital image are identified. The salient portion of the digital image contains a salient object which corresponds to the most important or noticeable object in a digital image, as opposed to non-salient objects which correspond to less important background objects or portions of an image. A placement region for the textual content within the non-salient portion of the digital image is automatically determined, and the digital image is modified by positioning the textual content within the automatically determined placement region of the digital image. Positioning the textual content may include automatically adjusting the textual content to fit within the placement region, such as by automatically scaling or aligning the textual content.

20 Claims, 12 Drawing Sheets

(56) References Cited

U.S. PATENT DOCUMENTS

| | | | | |
|---|---|---|---|---|
| 2005/0229111 A1* | 10/2005 | Makela | ............... | G06F 3/0481 715/802 |
| 2006/0217954 A1* | 9/2006 | Koyama | ............... | G06F 40/58 704/2 |
| 2008/0002893 A1* | 1/2008 | Vincent | ............... | G06K 9/3258 382/229 |
| 2009/0027552 A1 | 1/2009 | Yang et al. | | |
| 2009/0041352 A1* | 2/2009 | Okamoto | ............. | G06F 40/103 382/176 |
| 2011/0238768 A1* | 9/2011 | Habets | ............... | G06F 19/321 709/206 |
| 2011/0273474 A1* | 11/2011 | Iwayama | ........... | H04N 5/23219 345/636 |
| 2012/0249734 A1* | 10/2012 | Takayama | ............ | H04N 13/361 348/43 |
| 2013/0223740 A1* | 8/2013 | Wang | ............... | G06T 7/143 382/171 |
| 2014/0198234 A1* | 7/2014 | Kobayashi | ........ | H04N 1/32144 348/231.99 |
| 2015/0370889 A1* | 12/2015 | Chiba | ............... | G06K 9/46 382/176 |
| 2017/0032553 A1 | 2/2017 | O'Donovan | | |
| 2017/0199632 A1* | 7/2017 | Ohmura | ............... | G09G 5/00 |
| 2017/0249674 A1 | 8/2017 | Kerger et al. | | |
| 2017/0336926 A1* | 11/2017 | Chaudhri | ............... | H04L 51/22 |
| 2018/0032481 A1 | 2/2018 | Ishida | | |
| 2018/0268571 A1* | 9/2018 | Park | ............... | G06N 3/0454 |
| 2019/0192232 A1* | 6/2019 | Altmann | ............. | A61B 5/0077 |

OTHER PUBLICATIONS

"Final Office Action", U.S. Appl. No. 16/601,263, filed Feb. 10, 2021, 13 pages.

"Pre-Interview First Office Action", U.S. Appl. No. 16/601,263, filed Dec. 1, 2020, 12 pages.

"Non-Final Office Action", U.S. Appl. No. 16/601,263, filed Apr. 29, 2021, 13 pages.

"Final Office Action", U.S. Appl. No. 16/601,263, filed Oct. 18, 2021, 15 pages.

"Notice of Allowance", U.S. Appl. No. 16/601,263, filed Dec. 22, 2021, 6 pages.

\* cited by examiner

AUTOMATIC POSITIONING OF TEXTUAL CONTENT WITHIN DIGITAL IMAGES

BACKGROUND

Content editing systems include a variety of tools that enable modification of vast amounts of digital visual content, such as digital images—an example of which is digital photographs. Users are able to interact with these content editing systems in various ways (e.g., touch functionality, styluses, keyboard and mouse, and so on) to modify digital images. As part of this, many conventional content editing systems allow users to add text to digital images. Text may be added to a digital image, for example, as part of a marketing campaign, or in order to publish a photo with textual content on a social network. However, conventional content editing systems simply display the text at a default position within the digital image, and then require the user to manually adjust the size and placement of the text within the digital image.

SUMMARY

To overcome these problems, automatic positioning of textual content within digital images is leveraged in a digital medium environment. Initially, user input is received to add textual content to a digital image. A salient portion and a non-salient portion of the digital image are identified. The salient portion of the digital image contains a salient object which corresponds to the most important or noticeable object in a digital image, as opposed to non-salient objects which correspond to less important background objects or portions of an image. A placement region for the textual content within the non-salient portion of the digital image is automatically determined. In some cases, the placement region is determined by generating a saliency mask that defines the salient and non-salient regions and determining candidate placement regions within the non-salient region. The placement region is then selected from the candidate placement region based on various text placement factors, such as a size of respective candidate placement regions and a distance of the respective candidate placement regions from the salient object.

After the placement region is automatically determined, the digital image is modified by positioning the textual content within the automatically determined placement region of the digital image. Positioning the textual content may include automatically adjusting the textual content to fit within the placement region, such as by automatically scaling or aligning the textual content. The textual content can be scaled, for example, by adjusting the font size or font type of the textual content or adjusting spacing between individual characters of the textual content so that the textual content fills the placement region.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
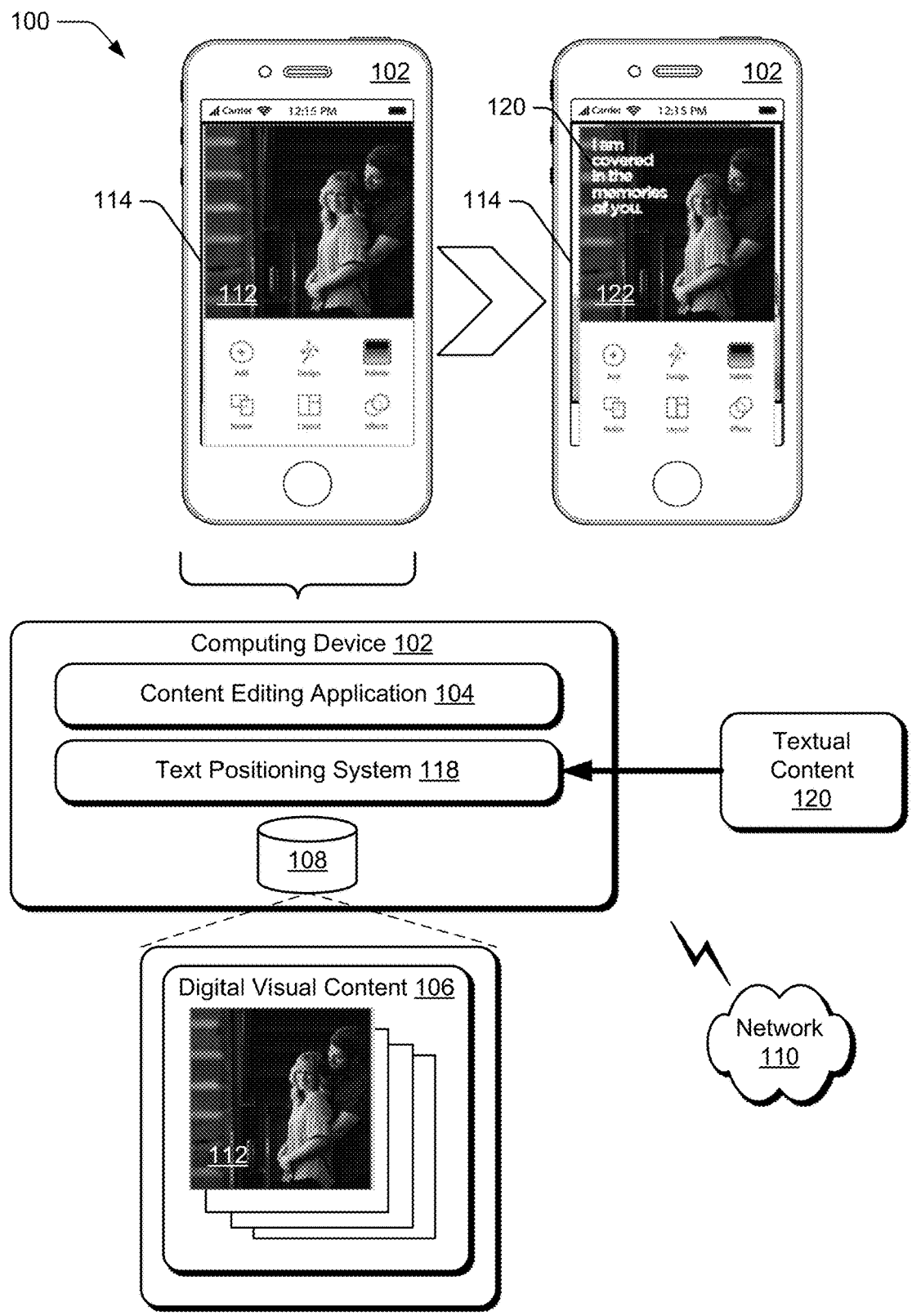
FIG. 1 is an illustration of an environment in an example implementation that is operable to employ techniques described herein.

Many conventional content editing systems allow users to add text to digital images. However, these conventional content editing systems may initially display the text with a default font size and in a default portion of the digital image, such as in a centered position within the digital image. Doing so often causes the digital image and text to appear cluttered, and the text may obstruct a main subject of the digital image, such as a person or object that is the focus of the digital image. These conventional content editing systems require additional user input to manually adjust the placement position and/or font size of the text within the digital image. For example, the user may be required to reposition the text from the displayed centered position to various different positions in order to find the best place to position the text on the image so that textual content looks good within the digital image. Along with providing additional input to move the text, the user may be further required to manipulate the text by rescaling or realigning the text until the desired position, font size, and alignment is achieved.

Other conventional systems may require the user to first manually specify a placement position within the digital image, and then provide the textual content to be included at the manually specified placement position. In either scenario, such conventional systems place the burden of positioning, scaling, and aligning textual content on the user, which often requires a significant amount of time and manual effort by the user resulting in user frustration. Moreover, requiring the user to position and scale the textual content can result in less than optimal positioning of the textual content within the digital image causing the entire composition to appear cluttered. This problem may be further intensified in instances where the user wants to add textual content to multiple images in a workflow like collage or presentation, as the sizing and placement of the textual content to achieve the optimal look must be manually provided for each image and thus consumes significant amount of time just for the placement and scaling of the text to achieve a better output.

To overcome these problems, automatic positioning of textual content within digital images is described. The described techniques intelligently determine an optimal placement region for textual content within a digital image, and then automatically modify the digital image to generate a composition which includes the textual content positioned within the automatically determined placement region of the digital image. Initially, user input is received to add textual content to a digital image, such as via user input to type text into a user interface or as spoken words that are captured by a microphone and converted into text using text recognition techniques. A user may add textual content to the digital image for a variety of different reasons, such as to generate images with text as part of a marketing campaign, or to post images with text on a social network.

Unlike conventional techniques that position the textual content at a default position within the digital image (e.g., a centered position), the described techniques can automatically determine a placement region for the textual content within the digital image. The placement region can be automatically determined based on a context of the digital image and the textual content. Generally, the placement region is determined based on the image context in order to ensure that the textual content does not obstruct a salient object of the digital image and that the textual content is balanced with the salient object of the digital image. To do so, the digital image can be processed to identify a salient portion of the image that contains the salient object, and a non-salient portion of the digital image that does not contain the salient object. As described herein, a salient object of an image corresponds to the most important or noticeable object in a digital image, as opposed to non-salient objects which correspond to less important background objects or portions of an image. Thus, the salient portion of the digital image contains the salient object of the digital image (e.g., a person or object that that is the primary focus of the digital image), while the non-salient portion corresponds to a remaining portion of the digital image which does not contain the salient object.

Next, a placement region for the textual content can be automatically determined within the non-salient portion of the digital image. Constraining the location of the placement region to the non-salient portion ensures that the textual content, when placed in the digital image, will not obstruct the salient object of the digital image which is located in the salient portion, while maintaining a visual balance between the textual content and the salient object. The placement region can be automatically determined by generating a saliency mask that defines the salient portion and the non-salient portion of the digital image, and then determining candidate placement regions within the non-salient portion of the digital image based on the saliency mask. The candidate placement regions can be prioritized by calculating individual scores for each of the candidate placement regions based on various text placement factors. The text placement factors are generally chosen to ensure an optimal placement region of the textual content within the digital image to maintain balance between the textual content and the salient object of the digital image In one or more implementations, the text placement factors, which are used to calculate the placement scores, include a size of each respective candidate placement region and a proximity of the candidate placement region to the salient object. In this scenario, larger candidate placement regions and greater distances from the salient object lead to higher scores for the respective candidate placement regions. A placement region can then be selected from the candidate placement regions based on the placement scores, such as by selecting the placement region with the highest placement score.

After the placement region is automatically determined, the digital image can be modified by positioning the textual content within the automatically determined placement region of the digital image. Positioning the textual content may include automatically adjusting the textual content to fit within the placement region, such as by automatically scaling or aligning the textual content. The textual content can be scaled, for example, by adjusting the font size or font type of the textual content or adjusting spacing between individual characters of the textual content so that the textual content fills the placement region. The modified digital image can then be output for display by a computing device.

In one or more implementations, the described techniques can be implemented to automatically scale and position additional textual content in an additional placement region of a digital image based on the context of the digital image as well as the previously added textual content. For example, a user may wish to add additional textual content to the digital image after the first textual content has been added. Conventional systems require the user to manually position, scale, and align the additional textual content, and then require the user to manually reposition or rescale the previously added textual content, each time that the user adds additional textual content. To solve this problem, the described techniques are further configured to automatically determine an additional placement region in the non-salient portion of the digital image for the additional textual content, and automatically position, scale, and align the additional text in context with the previously positioned textual content. In some cases, this is accomplished by positioning and scaling the additional textual content in the candidate placement region with a next highest placement score.

In one or more implementations, the described techniques can be implemented to automatically adjust the positioning of textual content within a digital image in response to user input to modify a view of the digital image, such as by panning, zooming, or rotating the digital image. Notably, when user input is received to adjust a view of a digital image with textual content, such as by panning or zooming the digital image, the positioning of the salient object within the digital image changes. This change in position causes the salient and non-salient regions of the image to be altered. As such, the previously added textual content, if maintained at its previous placement region within the image, may no longer be the ideal placement region due to the adjustment. To solve this problem, the described techniques can automatically generate an updated saliency mask defining the new salient and non-salient portions of the digital image, and then to determine an updated placement region for the textual content based on the updated saliency mask. The textual content can then be repositioned to fit within the updated placement region. Additionally, the textual content may be scaled to fit within the updated placement region. Thus, the described techniques are able to dynamically adjust to user input that adds additional text or modifies a view of the digital image without requiring manual input by the user.

The described system and techniques automatically improve the visual balance of compositions that include textual content within a digital image by automatically scaling and positioning textual content in a non-salient portion of a digital image. Moreover, the described techniques, greatly reduce the number of steps that conventional system require the user to manually perform in order to position, align, and scale textual content within digital images.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 7.

The computing device 102 is illustrated as including content editing application 104. The content editing application 104 represents functionality of the computing device 102 to create and/or edit digital content. By way of example, the content editing application 104 includes functionality to create or edit digital visual content, such as digital graphics, digital images, and digital images that include graphics. Examples of digital graphics include, but are not limited to, vector graphics, raster graphics (e.g., digital photographs), layouts having different types of graphics, and so forth.

Further, the content editing application 104 may enable a client device user to interact with application interfaces presented via the computing device 102 to perform content editing operations, such as selecting portions of digital content, removing selected portions of the digital content, modifying characteristics (e.g., color, blur, saturation, brightness, and so on) of selected portions of the digital content, selecting options to perform automatic modifications of the digital content, and so forth. The content editing application 104 may facilitate other content editing operations without departing from the spirit or scope of the techniques described herein. The content editing application 104 may further be representative of more than one application (e.g., a suite of applications) that supports functionality to perform content editing operations on various types of digital content without departing from the spirit or scope of the techniques described herein.

At least some of the digital content, relative to which the content editing application 104 is configured to perform operations, is represented by digital visual content 106, which is illustrated as maintained in storage 108 of the computing device 102. Although the digital visual content 106 is illustrated as being maintained in the storage 108, the digital visual content 106 may also represent digital visual content accessible to the computing device 102 in other ways, e.g., accessible to the computing device 102 from storage of another device over network 110 or digital visual content captured by a camera of the computing device 102. The digital visual content 106 may represent various types of digital content without departing from the spirit or scope of the techniques described herein. The digital visual content 106 is depicted with digital image 112, for instance, which is also depicted being displayed via display device 114 of the computing device 102.

In the illustrated environment 100, the computing device 102 is depicted as including a text positioning system 118, the functionality of which may be incorporated in and/or accessible to the content editing application 104. The text positioning system 118 is implemented at least partially in hardware of the computing device 102 to automatically determine a placement region for textual content 120 within a non-salient portion of the digital visual content 106. The textual content 120 can be obtained by the text positioning system 118 in a variety of different ways. An example of this is to receive user input via a user interface displaying the digital image 112, namely, to add textual content 120 to the digital image 112 by typing the characters of the textual content 120 into an area of the user interface configured to receive text. A user of the computing device 102 may provide input to add textual content 120 to the digital content 106 in other ways without departing from the spirit or scope of the described techniques, such as by writing using a stylus or the user's finger, voice commands, and so forth.

In response to receiving input to add the textual content 120 to the digital image 112, the text positioning system 118 can generate a modified digital image 122 by positioning the textual content 120 at the determined placement region within the digital image "automatically," e.g., without receiving user input to specify a size or position of the textual content 120. Instead, user input is simply received to provide the textual content 120 (e.g., by typing or speaking the words of the textual content 120), and the text positioning system 118 automatically scales and positions the textual content 120 within the digital image 112. In example 100, the display device 114 is depicted displaying the modified digital image 122 with the textual content 120 positioned at the object placement position within the digital image. Although illustrated as implemented locally at the computing device 102, functionality of the illustrated text positioning system 118 may also be implemented in whole or part via functionality available via the network 110, such as part of a web service or "in the cloud."

Having considered an example environment, consider now a discussion of some example details of the techniques for automatic positioning of textual content within digital images in a digital medium environment in accordance with one or more implementations.

Figure 2:
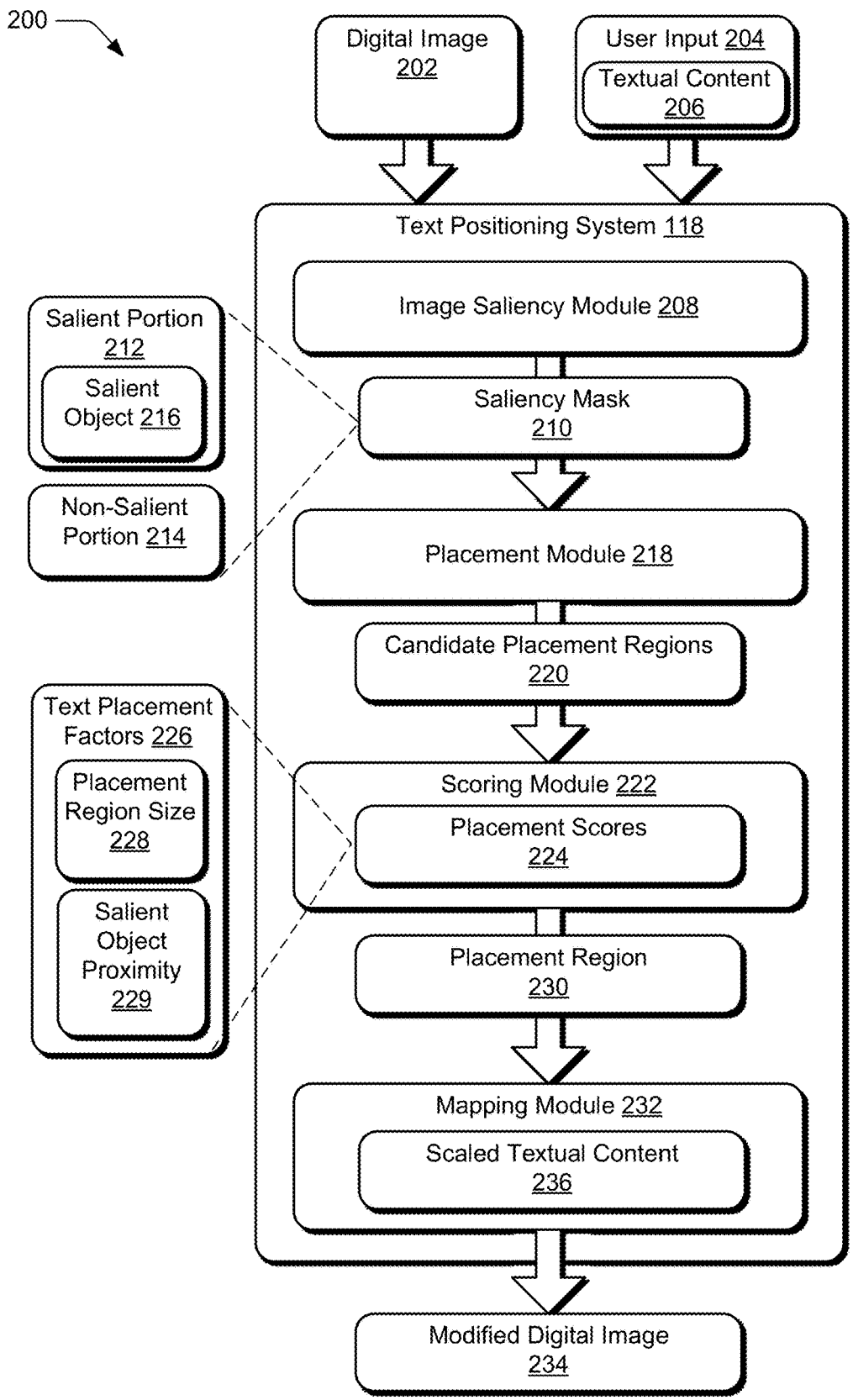
FIG. 2 depicts an example system in which a text positioning system of FIG. 1 automatically positions textual content within a digital image in accordance with the described techniques.

FIG. 2 depicts an example system 200 in which a text positioning system of FIG. 1 automatically positions textual content within a digital image in accordance with the described techniques. The illustrated example 200 includes from FIG. 1 the text positioning system 118. In the illustrated example 200, the text positioning system 118 includes an image saliency module 208, a placement module 218, a scoring module 222, and a mapping module 232. Although depicted with these four modules, in implementation the text positioning system 118 may include more, fewer, or different modules to automatically position textual content within a digital image without departing from the spirit or scope of the techniques described herein.

In the illustrated example 200, the text positioning system 118 is depicted receiving a digital image 202, such as a digital photograph, a collection of digital photographs, or a digital video. Additionally, the text positioning system 118 obtains user input 204 describing textual content 206 to add to the digital image 202. The content editing application 104 provides tools that enable a user of the computing device 102 to select the digital image 202 and to provide the user input 204 defining the textual content 206. For instance, the content editing application 104 can display the digital image 202 via a user interface of the application for editing and provide a selectable text control that enables the user to provide the user input 204 defining the textual content 206. In this scenario, the user can select the text control and then type in the words of the textual content 206. Alternately or additionally, the content editing application 104 may provide an interface via which a user can provide user input 204 defining the textual content 206 in other ways, such as by receiving spoken commands from a user and using text recognition techniques to determine the textual content 206.

As described throughout, while the user input 204 describes the textual content to be included within the digital image 202, the user input 204 does not specify a position to place the textual content 206 within the digital image. Thus, the text positioning system 118 leverages the context of the digital image 202 and a size of the textual content 206 (e.g., the number of characters of the textual content) in order to automatically position the textual content 206 within the digital image 202.

The image saliency module 208 of the text positioning system 118 represents functionality to generate a saliency mask 210 that defines a salient portion 212 and a non-salient portion 214 of the digital image 202. The salient portion 212 of the digital image 202 includes a salient object 216 of the digital image. As described throughout, the salient object 216 of the digital image 202 corresponds to the most important or noticeable object in a digital image. The image saliency module 208 uses one or more known approaches for identifying salient content and generating a saliency mask 210 of the digital image 202.

By way of example, these known approaches include use of a neural network, such as ResNet, to identify the salient and non-salient portions of the digital image 202. ResNet is trained on ImageNet, a dataset of over 15 million labeled images, to identify salient portions of content in the digital images. Generally, ResNet contains four computational blocks, where each block contains a different number of residual units. In one example, the image saliency module 208 uses ResNet as the main feature extractor and atrous spatial pyramid pooling to find saliency in the digital image. To do so, the last block of ResNet can be modified to utilize atrous spatial pyramid pooling. It is to be appreciated that ResNet is just one example of known saliency detection approaches which may be utilized by the image saliency module 208 to identify saliency in the digital image, and that generally any type of known saliency detection approach may be used.

The saliency mask 210 is then generated to include information for each pixel of the digital image indicating whether the pixel contains salient or non-salient content, e.g., based on salient regions identified using ResNet. In one example, the saliency mask 210 is generated as a gray-scale image that is the same size as the original digital image 202 and is configured as a 2D array composed of 1's and 0's representative of whether the pixel is part of the salient portion 212 or the non-salient portion 214 of the digital image 202. In this example, the 0's in the saliency mask 210 represent pixels in the salient portion 212 of the digital image 202 while the 1's represent pixels in the non-salient portion 214 of the digital image 202.

The placement module 218 of the text positioning system 118 represents functionality to automatically determine a placement region for the textual content 206 within the non-salient portion 214 of the digital image 202 based on the saliency mask 210. First, the placement module 218 can determine candidate placement regions 220 within the non-salient portion 214 of the digital image 202 based on the saliency mask 210. The candidate placement regions 220 may correspond to boundary boxes which can be formed in the digital image to include only "1's" based on the saliency mask 210. Thus, to determine the candidate placement regions 220, the placement module 218 may traverse the saliency mask 210 to find "boxes" (e.g., rectangles) consisting entirely of 1's. This is discussed in more detail with regards to FIG. 3C.

The scoring module 222 of the text positioning system 118 represents functionality to prioritize the candidate placement regions 220 by generating individual placement scores 224 for each of the determined candidate placement regions 220 based on various text placement factors 226. In this example, the text placement factors 226 include a placement region size 228 and a salient object proximity 229. The placement region size 228 corresponds to the total area of the respective candidate placement region 220, and can be calculated using the coordinates of the respective candidate placement region 220 to determine a pixel length and pixel width of the bounding box that defines the boundary of the candidate placement region 220, and calculating the placement region size 228 by multiplying the pixel length by the pixel width of the candidate placement region 220. The salient object proximity 229 corresponds to a distance of the respective candidate placement region 220 from the salient object 216 in the salient portion 212 of the digital image. The salient object proximity 229, in some cases, can be calculated by determining respective center positions of the respective candidate placement region 224 and the salient object 216, and the calculating the distance in pixels between the respective center positions.

In one or more implementations, the scoring module 222 gives equal weight to the placement region size 228 and the salient object proximity 229 when calculating the placement score 224 by assigning a 0.5 weight to both the placement region size 228 (calculated as an area in pixels squared) and the salient object proximity (calculated as a distance in pixels). As an example, if the placement region size is 228 pixels squared and the salient object proximity 229 is 35 pixels, then the placement score 224 is calculated by the scoring module 222 to be 132 (230*0.5+35*0.5). The scoring module 222 can then normalize this resulting score. Alternately, the scoring module 222 may assign different weights to the placement region size 228 and the salient object proximity 229. For example, the placement region size 228 may be given a higher weight (e.g., a value of 0.6) than the salient object proximity 229 (e.g., a weight of 0.4).

Certainly the scoring module 222 can calculate placement scores 224 based on different text placement factors than those depicted and described in relation to the illustrated example without departing from the spirit or scope of the described techniques. Another text placement factor 224, for example, may be the alignment of the candidate placement region 220 with respect to the salient object 216. Here, alignment with respect to the salient object corresponds to the position of the candidate placement region 220 in the digital image with respect to the salient object 216. It is to be appreciated that certain alignments may be more preferred than other alignments. These preferences may be user specified preferences or simply preferences that improve the aesthetic composition of the textual content within the digital image. For example, placing textual content that is positioned to the right of the salient object may be more preferred than placing textual content below the salient object. In this scenario, the scoring module 222 can be configured to give extra weight to a candidate placement region that is positioned to the right of the salient object as compared to a candidate placement region positioned below the salient object.

The scoring module 220 can prioritize the candidate placement regions 220 based on the placement scores 224. For example, the candidate placement region 220 with the highest placement score 224 may be placed at the top of a ranked list, while the candidate placement region 220 with a lowest placement score 224 may be placed at the bottom of the ranked list. A placement region 230 can then be selected, from the candidate placement regions 220, based on the placement scores 224. In one or more implementations, the candidate placement region 220 with the highest placement score 224 is selected.

The mapping module 232 represents functionality of the text positioning system 118 to generate a modified digital image 234 by positioning the textual content 206 within the selected placement region 230 of the non-salient portion of the digital image 202. For example, the mapping module 232 can map the textual content 206 to the placement region 230 with the highest placement score 224, and then generate the modified digital image 234 to include the textual content 206 within the placement region 230. As part of this, the mapping module 232 may scale the textual content 206 to generate scaled textual content 236 in order to fill the placement region with the scaled textual content 236. To do so, the mapping module 232 can calculate a total size of the textual content 206 (e.g., the total length and width of the characters of the textual content in pixels) based on a default font size that is supported by the content editing application 104. The mapping module 232 can then scale the textual content 206 so that the scaled textual content 236 will fill the placement region 230. The mapping module 232 can scale the textual content 206 in a variety of different ways, including by adjusting the font size of the textual content (e.g., increasing or decreasing the font size), adjusting a font type of the textual content 206, adjusting the spacing between characters of the textual content (e.g., increasing or decreasing the spacing between characters), or aligning the textual content 206 to fit within the placement region 230.

Thus, the modified digital image 234 output by the text positioning system 118 automatically includes the textual content 206 at the optimal placement position within the digital image.

FIGS. 3A-3E depict an example 300 in which the text positioning system of FIG. 1 automatically positions textual content within a digital image in accordance with the described techniques. In the illustrated example 300 of FIG. 3A, the computing device 102 is depicted displaying user interface 302, which includes a displayed representation of a digital image 304 and a text control 306. Examples of the functionality of the text control 306 include exposure of a text box and a keyboard to type in the text box, use of a voice-based user interface, and so forth. In this example, a user has typed textual content 308, corresponding to "I am covered in the memories of you", into the text control 306. The user can then select the control "insert text" in order to initiate automatic insertion of the textual content 308 into the corresponding digital image 304. It is to be appreciated that the user interface 302 is just one example of a user interface that may be usable to insert textual content into digital images at automatically determined placement regions. Other interfaces, configured in myriad ways, may be surfaced and enable insertion of textual content into digital images in the spirit and scope of the described techniques.

In response to user input to insert the textual content 308 into the digital image 304, such as via selection of the "insert text" control of the text control 306, the image saliency module 208 can generate the image saliency mask for the digital image 304. By way of example, consider FIG. 3B in which the image saliency module 208 obtains the digital image 304, and identifies a salient object 309 in the digital image, which in this example includes an image of a couple. The image saliency module 208 then generates a saliency mask 314 which identifies a salient portion 310 (white region) that contains the salient object 309 and a non-salient portion 312 (black region) of the digital image 304.

Figure 3A:
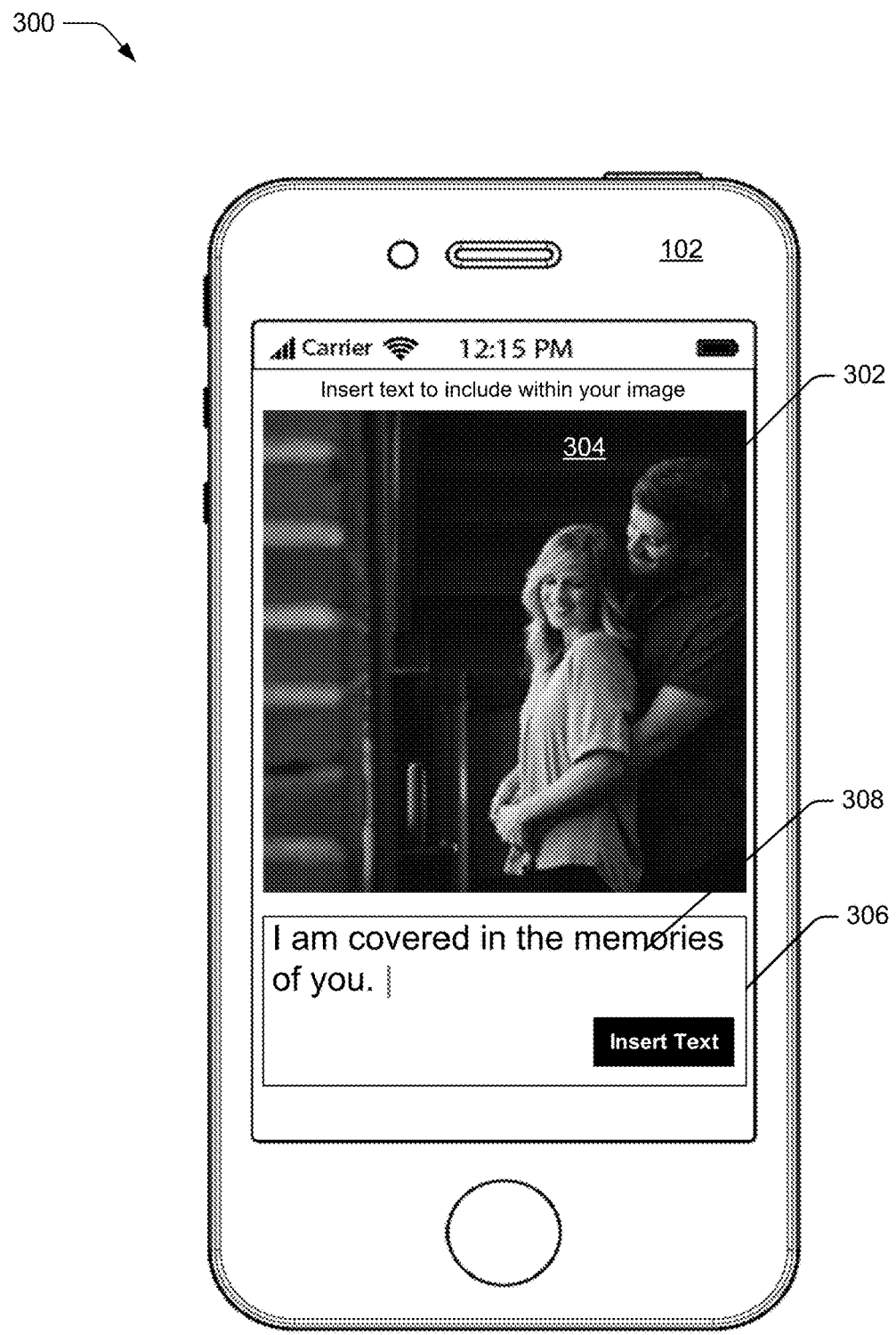
FIGS. 3A-3E depict an example in which the text positioning system of FIG. 1 automatically positions textual content within a digital image in accordance with the described techniques.
Figure 3B:
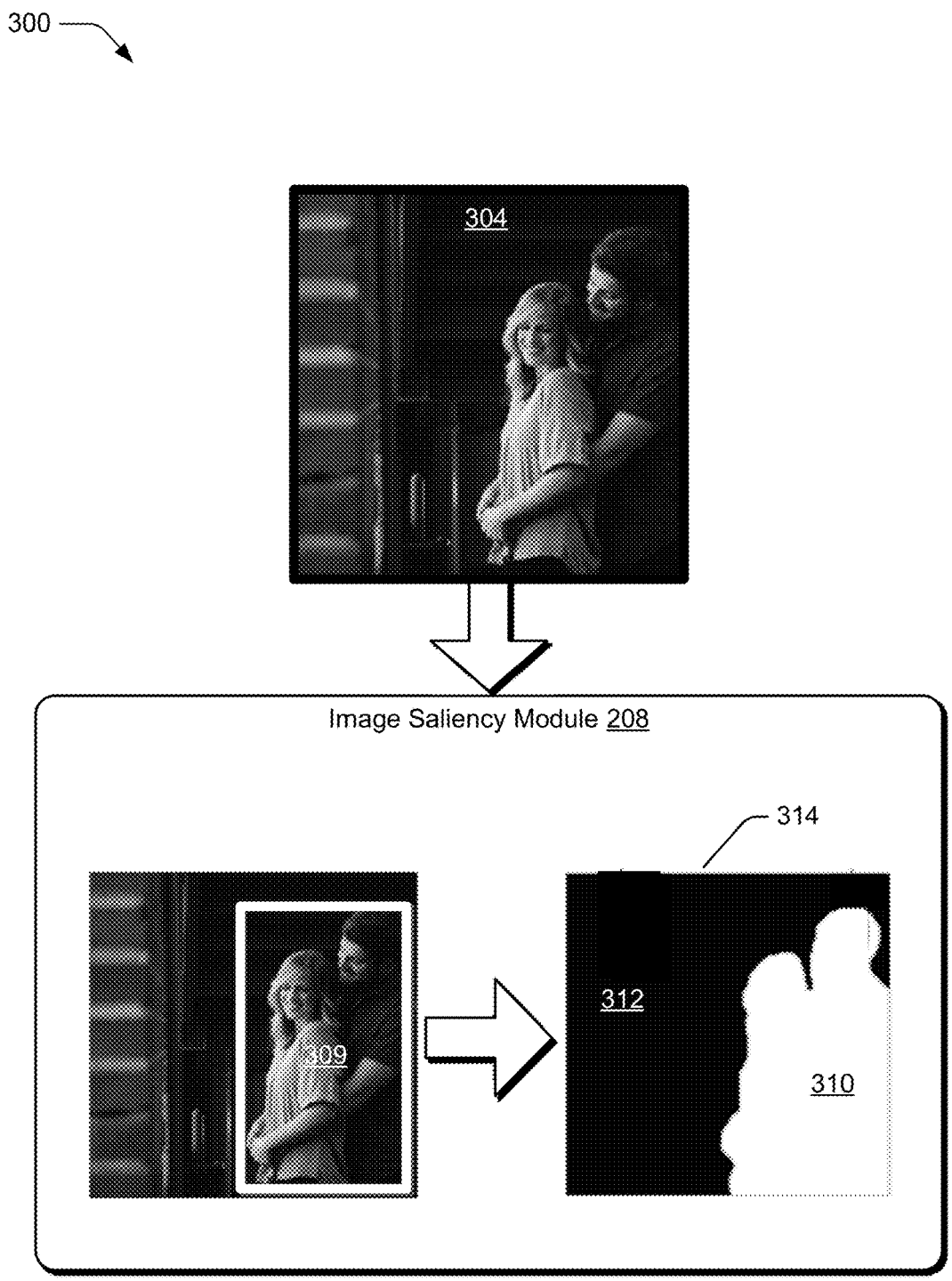
Figure 3C:
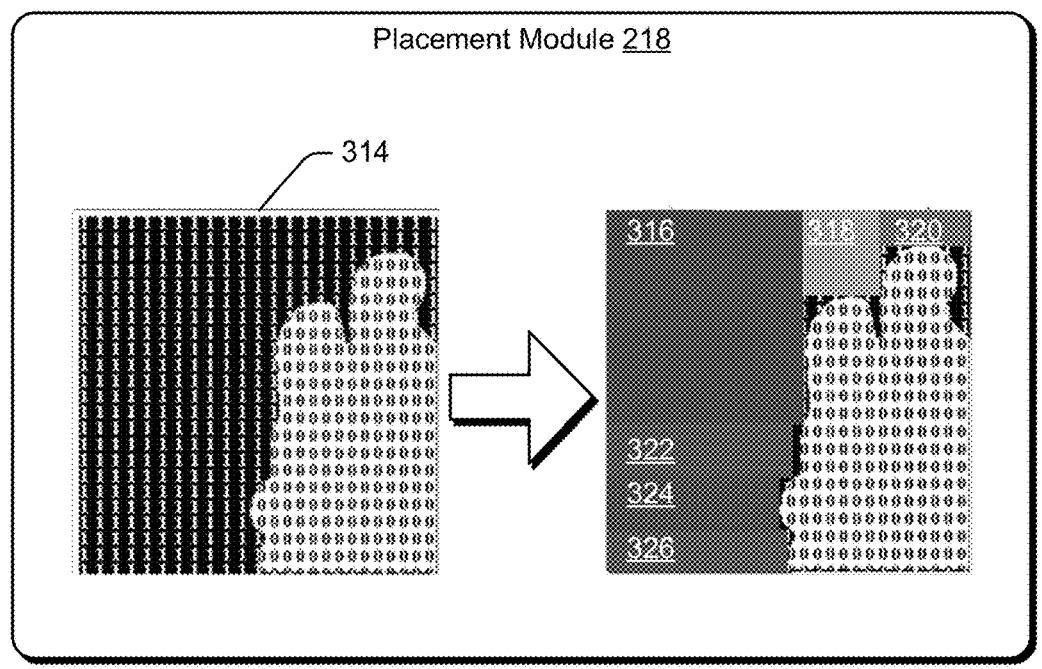

In FIG. 3C, based on the saliency mask 314 generated by the image saliency module 208, the placement module 218 determines candidate placement regions for the digital image 304. In this example, the salient portion of the saliency mask 314 is marked with "0's", while the non-salient portion of the saliency mask 314 is marked with "1s". The placement module 218 determines candidate placement regions within the non-salient portion of the digital image as defined by the saliency mask 314 by determining rectangles that can be formed which only have 1's based on the saliency mask 314. In this example, the placement module 218 is shown as identifying candidate placement regions 316, 318, 329, 322, 324, and 326. However, in some cases, additional candidate placement regions which are not depicted in FIG. 3C may be identified by the placement module 218.

In one or more implementations, the placement module 218 may discard or ignore candidate placement regions below a minimum size as text placed in too small of a box may be unreadable to the human eye. This minimum size may be predefined or in some case may be configurable by the user. In one or more implementations, the placement module 218 identifies the largest possible rectangles consisting entirely of "1's" based on the saliency mask 210 and identifies those rectangles as the candidate placement regions 220. In some cases, the largest possible rectangles may be determined such that the rectangles are adjacent to each other. For example, in FIG. 3C, note that the candidate placement regions 316, 318, 329, 322, 324, and 326 are the largest possible rectangles, consisting entirely of 1's, which are also adjacent to each other. In other words, candidate placement region 316 is formed as the largest candidate placement region, and then candidate placement regions 322 and 318 are identified as the largest placement regions that are adjacent to 316 in downward and horizontal directions, respectively.

In some cases, candidate placement regions other than rectangles may be identified by merging two or more candidate placement regions. For example, candidate placement regions 316 and 318 could be merged in some scenarios. In this case, the merged candidate placement regions 316 and 318 would form a polygon other than a rectangle. In one or more implementations, different shapes can be used for the candidate placement region, such as circles, triangles, pentagons, hexagons, and so forth.

Figure 3D:
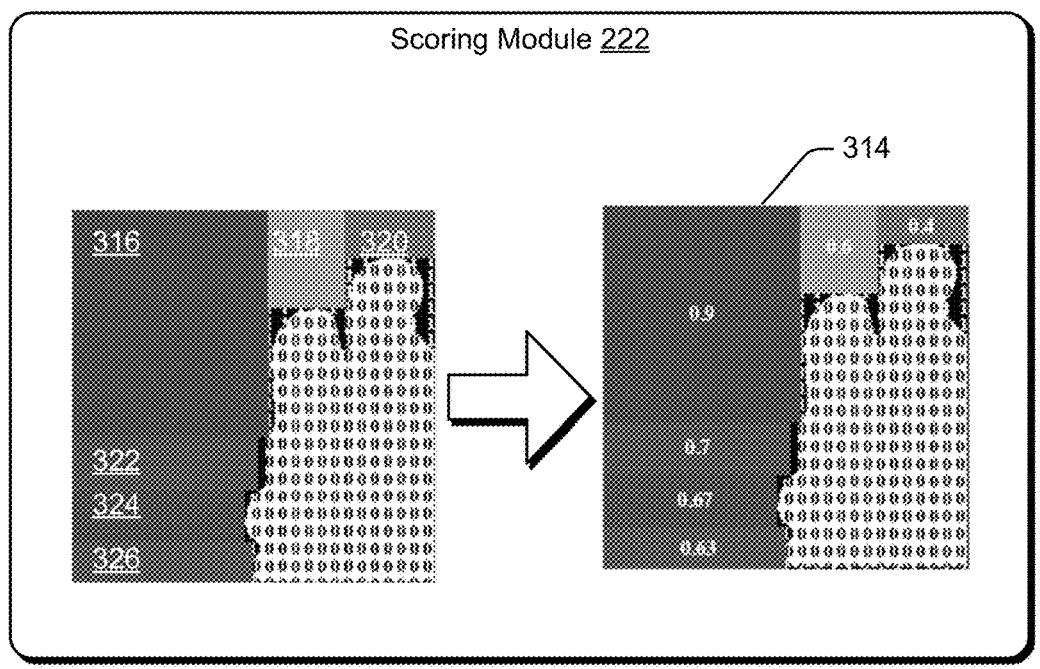

In FIG. 3D, the scoring module 222 determines a placement score for each of the individual candidate placement regions based on a size of the candidate placement region and a salient object distance. The placement scores, in this example, are determined as 0.9 for candidate placement region 316, 0.6 for candidate placement region 318, 0.4 for candidate placement region 320, 0.7 for candidate placement region 322, 0.67 for candidate placement region 324, and 0.63 for candidate placement region 326. Thus, candidate placement region 316 has the highest score (0.9) and is selected as the placement region. Notably, candidate placement region 316 has the highest score due to its size and distance from the salient object of the digital image.

Figure 3E:
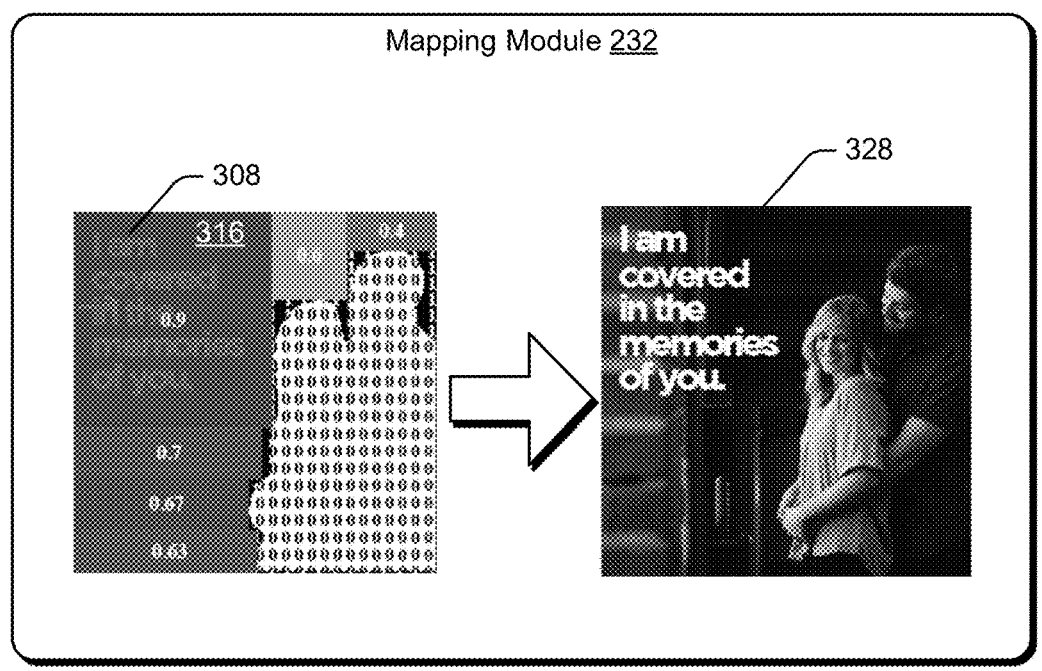

In FIG. 3E, the mapping module 232 maps the textual content 308 to the selected placement region with the highest placement score determined by the scoring module 222, which in this case is placement region 316 with a placement score of 0.9. As part of this mapping, the mapping module 232 may scale the textual content 308, by changing the font size, line spacing, and so forth, to fit within the placement region 316. Then, based on this mapping, a modified digital image 328 is generated to include the scaled textual content 308 within placement region 316 of the digital image 304. Notably, the textual content has been scaled to fill the placement region 316 and is balanced with the salient object of the digital image.

As described throughout, the mapping module 232 can scale the textual content 206 in a variety of different ways, including by adjusting the font size of the textual content (e.g., increasing or decreasing the font size), adjusting a font type of the textual content 206, adjusting the spacing between characters of the textual content (e.g., increasing or decreasing the spacing between characters), or aligning the textual content 206 within the placement region 230.

In one or more implementations, the mapping module 232 can adjust the font size to a maximum font size that fills the selected placement region 230. This can be accomplished by determining the maximum font size for the textual content that will fit within the selected placement region 230 based on the number of characters within the textual content. Notably, the type of font along with the number of characters and the font size may affect the size of the textual content. Thus, the mapping module 232 can factor in a designated or desired font type when determining the maximum font size for the textual content that will fit within the selected placement region 230. Alternately, the mapping module 232 may utilize an upper and lower limit for the font size to ensure that the font size is not too large or small. As an example, textual content with a font size of 40 may not look good in a digital image. Thus, the upper limit for the font size may be defined to ensure that the textual content is never too large given the size of the digital image. Similarly, a lower limit for the font size may be defined to ensure that textual content is not so small such that the text is unreadable.

In one or more implementations, if the textual content must be scaled to a font size that is below the lower limit in order to fit within the selected placement region 230, the mapping module 232 can automatically combine two or more candidate placement regions 220 that are located adjacent to each other. Doing so increases the size of the placement region so that the textual content can be scaled to a font size that is above the lower limit. In FIG. 3, for example, consider a scenario in which a large amount of textual content is received, and that the textual content will not fit within the selected placement region 316 unless the font size of the textual content is adjusted to a size that is below lower limit. In this scenario, candidate placement regions 316 and 318 could be combined so that the textual content fits within the combined region at a font size that is above the lower limit. Thus, the mapping module 232 can dynamically scale the textual content based on the size of the placement region and the number of characters of the textual content to cause the textual content to fill the selected placement region, while ensuring that the font size is between the upper and lower font size limits.

In one or more implementations, the mapping module 232 may adjust the alignment of the textual content in combination with adjusting the font size. Generally, alignment refers to the alignment of the textual content within the selected placement region, such as left-aligned, center-aligned, right-aligned, or justified. It is to be appreciated, therefore, that adjusting the size of the textual content can be performed to fit the textual content within the selected placement region, while adjusting the alignment improves the aesthetics of the textual content. It is to be appreciated that adjusting the size of the textual content can be performed to fit the textual content within the selected placement region, while adjusting the alignment improves the aesthetics of the textual content. In one or more implementations, the mapping module 232 can align the textual content based on the location of the textual content relative to the salient object. In FIG. 3E, for example, note that the textual content is adjusted to be left-aligned because the salient object is located to the right of the textual content. In contrast, if the salient object were positioned on the left side of the digital image and the textual content was positioned on the right side, then the mapping module could right-align or center-align the textual content to improve the aesthetics of the textual content within the digital image.

Figure 4:
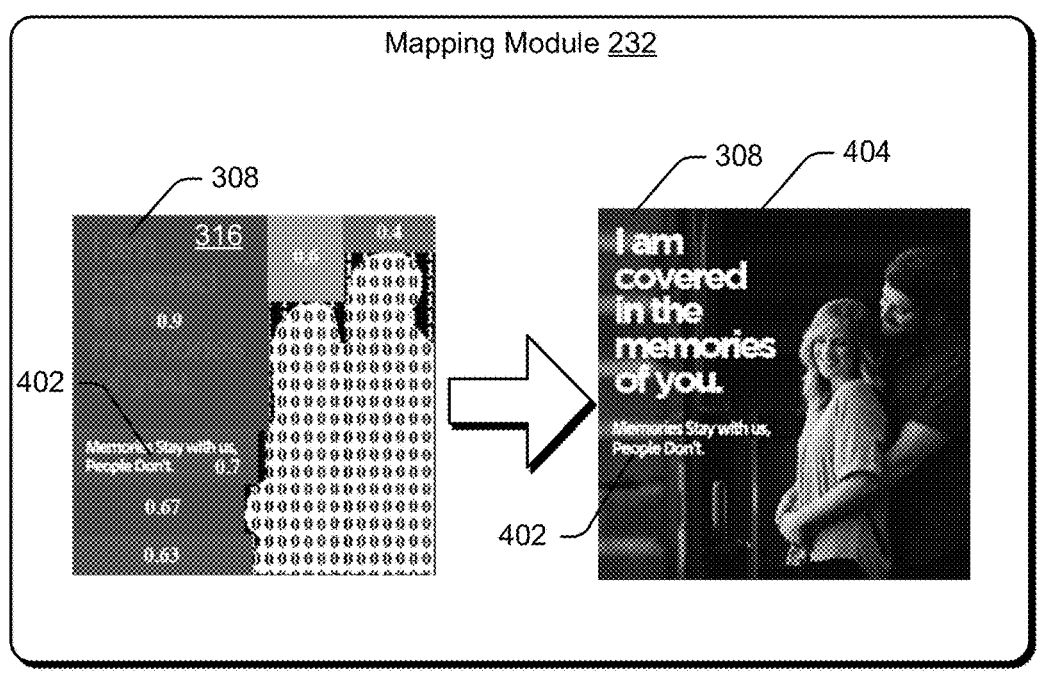
FIG. 4 illustrates an example in which the text positioning system of FIG. 1 automatically positions additional textual content within a digital image in accordance with the described techniques.

FIG. 4 illustrates an example 400 in which the text positioning system of FIG. 1 automatically positions additional textual content within a digital image in accordance with the described techniques. In this example, additional user input is received which includes additional textual content 402 that includes the words "Memories Stay with us, People Don't". Conventional systems may require the user to manually position, scale, and align the additional textual content, and then require the user to manually reposition or rescale the previously added textual content, each time that the user adds additional textual content.

However, in one or more implementations, the described techniques are further configured to automatically determine an additional placement region in the non-salient portion of the digital image for the additional textual content, and automatically position, scale, and align the additional text in context with the previously positioned textual content. To do so, the mapping module 232 can map the additional textual content 402 into the candidate placement region with a next highest score, which in this example corresponds to candidate placement region 322 with a placement score of 0.7. Thus, the additional textual content 402 is positioned in the placement region 322. Along with placing the additional textual content 402 into the placement region 322, the text positioning system 118 may scale the additional textual content 402 to fit within the placement region 322. In this example, the placement region 322, with the next highest score, is smaller than the placement region 316, with the highest score, which contains the original textual content 308. Thus, the mapping module 232 scales the additional textual content 402 by decreasing the font size of the additional textual content 402, relative to the textual content 308, so that the additional textual content 402 will fit within the placement region 322. Then, the mapping module 232 generates an additional modified image 404 which includes both textual content 308 within the placement region 316 and the additional textual content 402 within the placement region 322.

Figure 5:
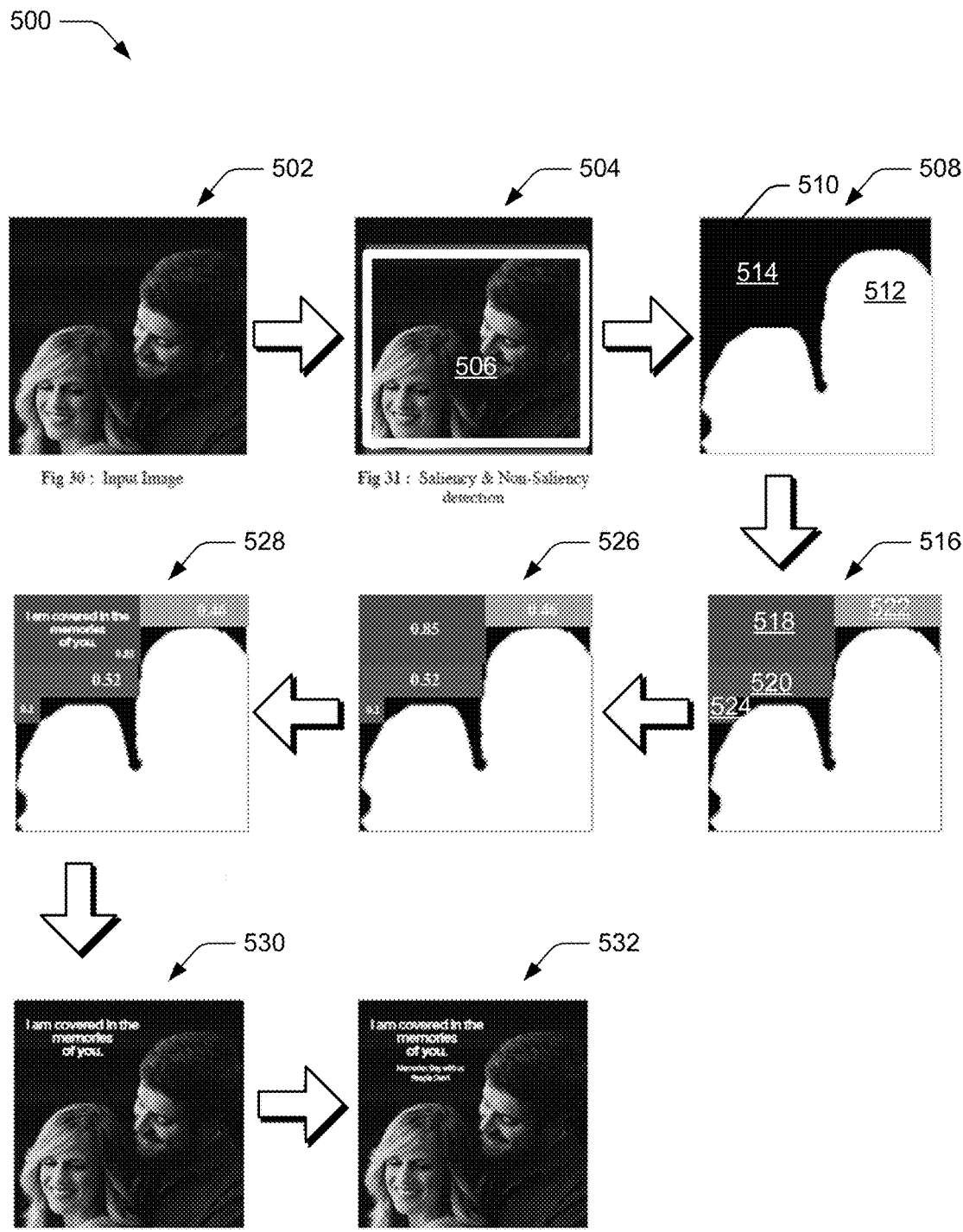
FIG. 5 illustrates an example in which the text positioning system of FIG. 1 automatically scales and adjusts the positioning of textual content within a digital image in response to user input to modify a view of the digital image.

FIG. 5 illustrates an example 500 in which the text positioning system of FIG. 1 automatically scales and adjusts the positioning of textual content within a digital image in response to user input to modify a view of the digital image.

At 502, the user adjusts the digital image 304 of FIGS. 3A-3E by zooming the digital image 304 to generate a zoomed digital image. Doing so changes the salient and non-salient regions of the digital image. At 504, the image saliency module 208 identifies a new salient object 506, which corresponds to a zoomed in view of the couple depicted in the digital image 304. Notably, while the salient object corresponds to the same couple, the positioning of the salient object within the digital image has changed as a result of the zoom operation. It is to be appreciated that if the textual content were to remain in the same original placement region, the textual content would obstruct the new positioning of the salient object in the zoomed digital image.

At 508, in order to adjust the placement of the textual content, the saliency module generates a new saliency mask 510 which identifies a new salient portion 512 (white region) that contains the salient object 506 and a new non-salient portion 514 (black region) of the zoomed digital image. Next, at 516, the placement module 218 determines candidate placement regions for the zoomed digital image. As discussed throughout, the placement module 218 determines candidate placement regions within the non-salient portion of the digital image as defined by the new saliency mask 510 by determining all possible rectangles that can be formed in the new non-salient region 514. In this example, the placement module 218 is shown as identifying candidate placement regions 518, 520, 522, and 524.

At 526, the scoring module 222 determines a placement score for each of the individual candidate placement regions based on a size of the candidate placement region and a salient object distance. The placement scores, in this example, are determined as 0.85 for candidate placement region 518, 0.52 for candidate placement region 520, 0.46 for candidate placement region 522, and 0.1 for candidate placement region 524. Thus, candidate placement region 518 has the highest score (0.85) and is selected as the placement region.

At 528, the mapping module 232 re-maps the previously added textual content 308 to the selected placement region with the highest placement score determined by the scoring module 222, which in this case is placement region 518 with a placement score of 0.85. As part of this mapping, the mapping module 232 may scale the textual content 308, by changing the font size, line spacing, and so forth, to fit within the placement region 518. Then, based on this mapping, at 530 a modified zoomed digital image is generated to include the textual content 308 within the new placement region 518 of the digital image 304. Notably, the textual content has been scaled to fill the placement region 518 and is balanced with the salient object of the digital image. At 532, the additional textual content has been repositioned into the new candidate placement region 520, which in this example has the second highest placement score (0.52) of the candidate placement regions.

Figure 6:
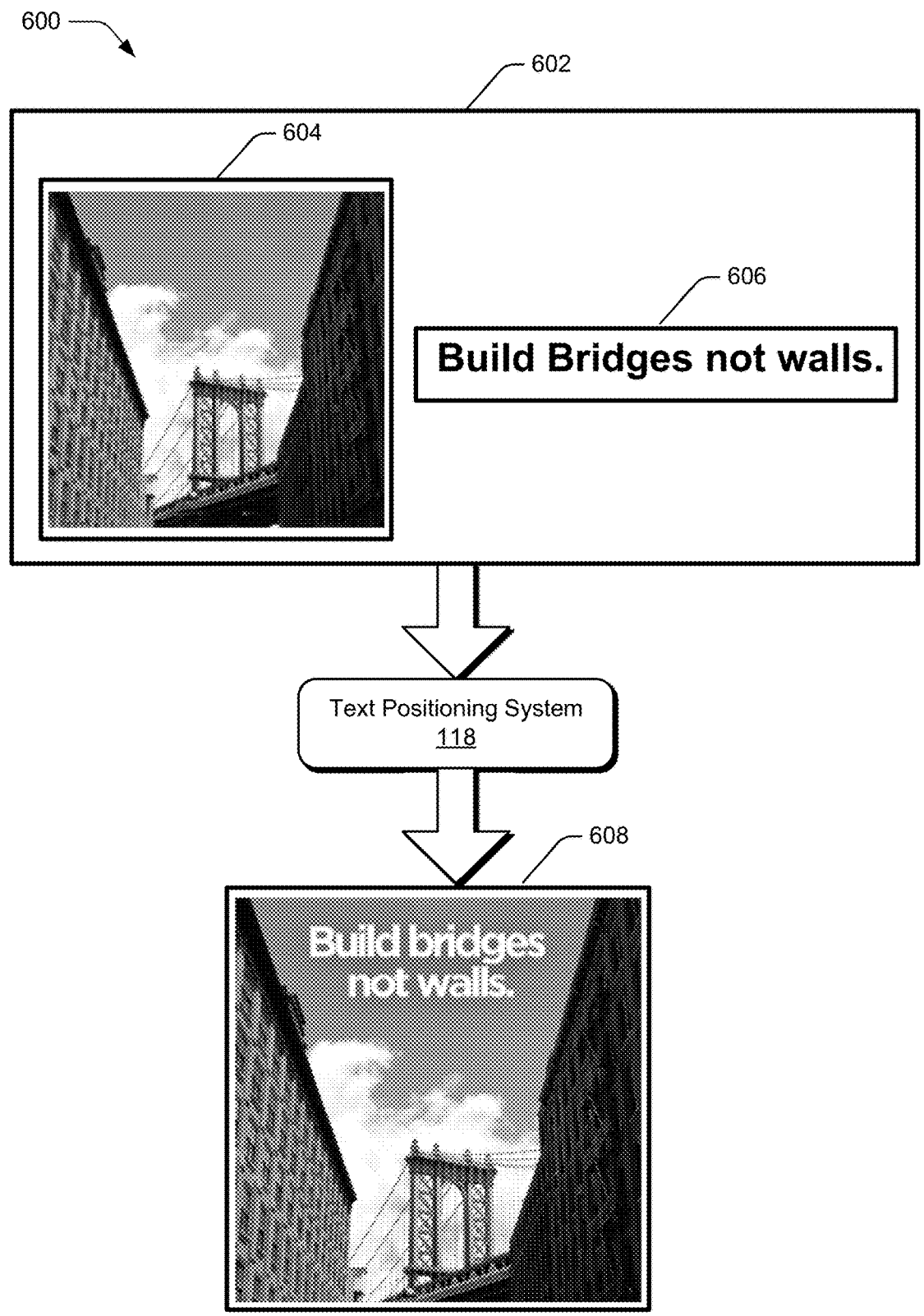
FIG. 6 illustrates an example of automatic positioning of textual content within a digital image by the text positioning system of FIG. 1.

FIG. 6 illustrates an example 600 of automatic positioning of textual content within a digital image by the text positioning system of FIG. 1. In this example, user input 602 is received by the text positioning system 118 which identifies a digital image 604 and textual content 606 for inclusion within the digital image 604. Instead of simply placing the textual content 606 in a default position within the digital image 604 (e.g., a centered position), the text positioning system 118 automatically determines a placement region in a non-salient portion of the digital image 604, and then generates a modified digital image 608. It is to be appreciated that the modified digital image 608 generated by the text positing system 118 automatically positions the textual content 606 in the automatically determined placement region within the non-salient portion of the digital image such that the textual content 606 does not obstruct the salient object (e.g., the bridge) depicted in the digital image 604. Moreover, the text positioning system 118 has scaled the textual content 606 (e.g., by decreasing the font size and changing the alignment) such that the textual content 606 occupies two lines and is centered within the automatically determined placement region.

It is to be appreciated that in order to generate the modified digital image 608 using a conventional system, the user would be required to perform at least two manual operations: at least one operation to decrease the font size and at least one additional operation to move the textual content within the digital image. Moreover, if the user wanted to subsequently modify the digital image such as by adding additional textual content or changing a view of the image, a conventional system may require the user to perform even more manual operations in order to reposition the textual content and the additional textual content. In contrast, as discussed throughout, the text positioning system 118 is further implemented to adjust the scaling and positioning of the textual content in response to user input to change the view, such as by panning, zooming, or rotating the digital image.

Thus, it is to be appreciated that the text positioning system 118 described herein automatically improves the visual balance of compositions that include textual content within a digital image by automatically scaling and positioning textual content in a non-salient portion of a digital image. In doing so, the described techniques reduce the number of steps that conventional system require the user to manually perform in order to position, align, and scale textual content within digital images.

Having discussed example details of the techniques for automatic positioning of textual content within digital images, consider now some example procedures to illustrate additional aspects of the techniques.

Example Procedures

Figure 7:
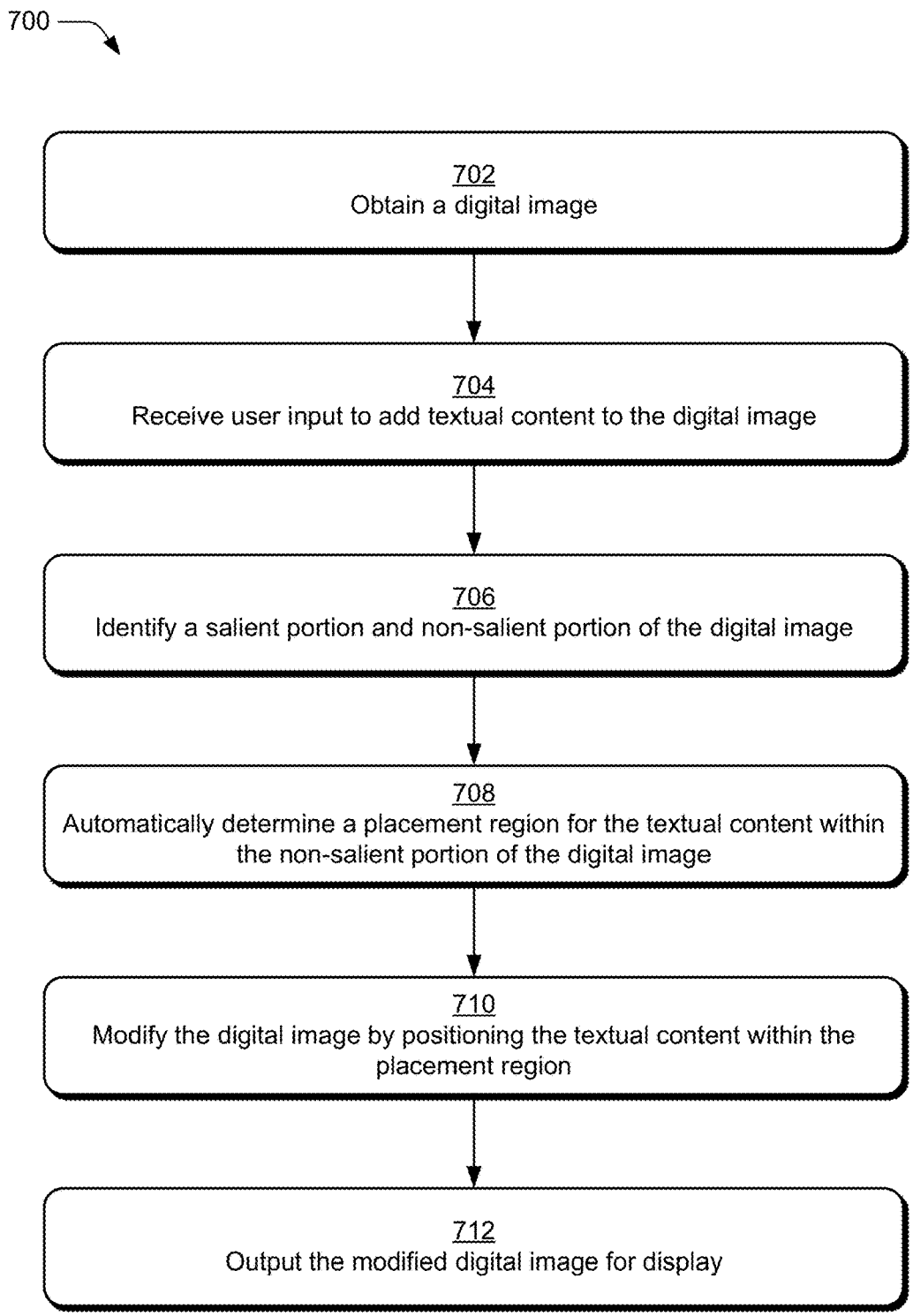
FIG. 7 depicts an example procedure of automatic positioning of textual content within digital images in one or more implementations.

FIG. 7 depicts an example procedure 700 of automatic positioning of textual content within digital images in one or more implementations. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some implementations the procedure is performed by a suitably configured device, such as the computing device 102 of FIG. 1 or the system 200 of FIG. 2.

A digital image is obtained (block 702), and user input to add textual content to the digital image is received block (block 704). In accordance with the principles discussed herein, the user input describes the textual content to be included within the digital image but does not specify a position to place the textual content 206 within the digital image. By way of example, text positioning system 118 receives a digital image 202, such as a digital photograph, a collection of digital photographs, or a digital video. Additionally, the text positioning system 118 obtains user input 204 describing textual content 206 to add to the digital image 202. The content editing application 104 provides tools that enable a user of the computing device 102 to select the digital image 202 and to provide the user input 204 defining the textual content 206. For instance, the content editing application 104 can display the digital image 202 via a user interface of the application for editing and provide a selectable text control that enables the user to provide the user input 204 defining the textual content 206. In this scenario, the user can select the text control and then type in the words of the textual content 206. Alternately or additionally, the content editing application 104 may provide a interface via which a user can provide user input 204 defining the textual content 206 in other ways, such as by receiving spoken commands from a user and using text recognition techniques to determine the textual content 206.

A salient portion and a non-salient portion of the digital image are identified (block 706). In accordance with the principles discussed herein, a salient object of a digital image corresponds to the most important or noticeable object in a digital image, as opposed to non-salient objects which correspond to less important background objects or portions of an image. Thus, the salient portion of the digital image contains the salient object of the digital image (e.g., a person or object that that is the primary focus of the digital image), while the non-salient portion corresponds to a remaining portion of the digital image which does not contain the salient object. By way of example, the image saliency module 208 of the text positioning system 118 identifies a salient portion 212 that contains a salient object 216 and a non-salient portion 214 of a digital image 202.

A placement region for the textual content is automatically determined within the non-salient portion of the digital image (block 708). By way of example, the text positioning system 118 automatically determines a placement region 230 for the textual content 206 within the non-salient portion 214 of the digital image 202. The placement region 230 can be automatically determined in a variety of different ways based on a context of the digital image.

In one or more implementations, the text positioning system 118 determines the placement region 230 by utilizing the image saliency module 208 of the text positioning system 118 to generate a saliency mask 210 that defines the salient portion 212 and the non-salient portion 214 of the digital image 202. The saliency mask 210 is a 2D array composed of 1's and 0's, where the 0's represent the salient portions of the digital image 202 and the 1's represent the non-salient portions of the digital image 202. As such, the image saliency module 208 generates the saliency mask 210 by marking areas of the saliency mask 210 as "0" and "1" regions corresponding to the salient portion 212 and non-salient portion 214, respectively, of the digital image 202.

Next, the placement module 218 of the text positioning system 118 determines candidate placement regions 220 within the non-salient portion 214 of the digital image 202 based on the saliency mask 210. The candidate placement regions 220 may correspond to boundary boxes which can be formed in the digital image to include only "1's" based on the saliency mask 210. Thus, to determine the candidate placement regions 220, the placement module 218 traverses the saliency mask 210 to find all possible "boxes" (e.g., rectangles) consisting entirely of 1's.

Next, the scoring module 222 of the text positioning system 118 prioritizes the candidate placement regions 220 by generating individual placement scores 224 for each of the determined candidate placement regions 220 based on various text placement factors 226, such as the placement region size 228 and the salient object proximity 229. The placement region size 228 corresponds to the total area of the respective candidate placement region 220, and can be calculated using the coordinates of the respective candidate placement region 220 to determine a length and width of the bounding box that defines the boundary of the candidate placement region 220, and calculating the placement region size 228 by multiplying the length by the width of the candidate placement region 220. The salient object proximity 229 corresponds to a distance of the respective candidate placement region 220 from the salient object 216 in the salient portion 212 of the digital image. The scoring module 222 prioritizes the candidate placement regions 220 based on the placement scores 224. For example, the candidate placement region 220 with the highest placement score 224 is placed at the top of a ranked list, while the candidate placement region 220 with a lowest placement score 224 is placed at the bottom of the ranked list. A placement region 230 is then selected by the text positioning module 118, from the candidate placement regions 220, based on the placement scores 224. In one or more implementations, the candidate placement region 220 with the highest placement score 224 is selected by the text positioning system 118.

The digital image is modified by positioning the textual content within the placement region (block 710), and the modified image is output for display (block 712). By way of example, the mapping module 232 of the text positioning system 118 generates a modified digital image 234 by positioning the textual content 206 within the selected placement region 230 of the non-salient portion of the digital image 202. To do so, the mapping module 232 maps the textual content 206 to the placement region 230 with the highest placement score 224, and then generates the modified digital image 234 to include the textual content 206 within the placement region 230. As part of this, the mapping module 232 scales the textual content 206 to generate scaled textual content 236 in order to fill the placement region with the scaled textual content 236. To do so, the mapping module 232 calculates a total size of the textual content 206 (e.g., the total length and width of the characters of the textual content) based on a default font size that is supported by the content editing application 104. The mapping module 232 then scales the textual content 206 so that the scaled textual content 236 will fill the placement region 230. The mapping module 232 can scale the textual content 206 in a variety of different ways, including by adjusting the font size of the textual content (e.g., increasing or decreasing the font size), adjusting a font type of the textual content 206, adjusting the spacing between characters of the textual content (e.g., increasing or decreasing the spacing between characters), or aligning the textual content 206 to fit within the placement region 230. Thus, the modified digital image 234 output by the text positioning system 118 for display automatically includes the textual content 206 at the optimal placement position within the digital image.

Having described example procedures in accordance with one or more implementations, consider now an example system and device that can be utilized to implement the various techniques described herein.

Example System and Device

Figure 8:
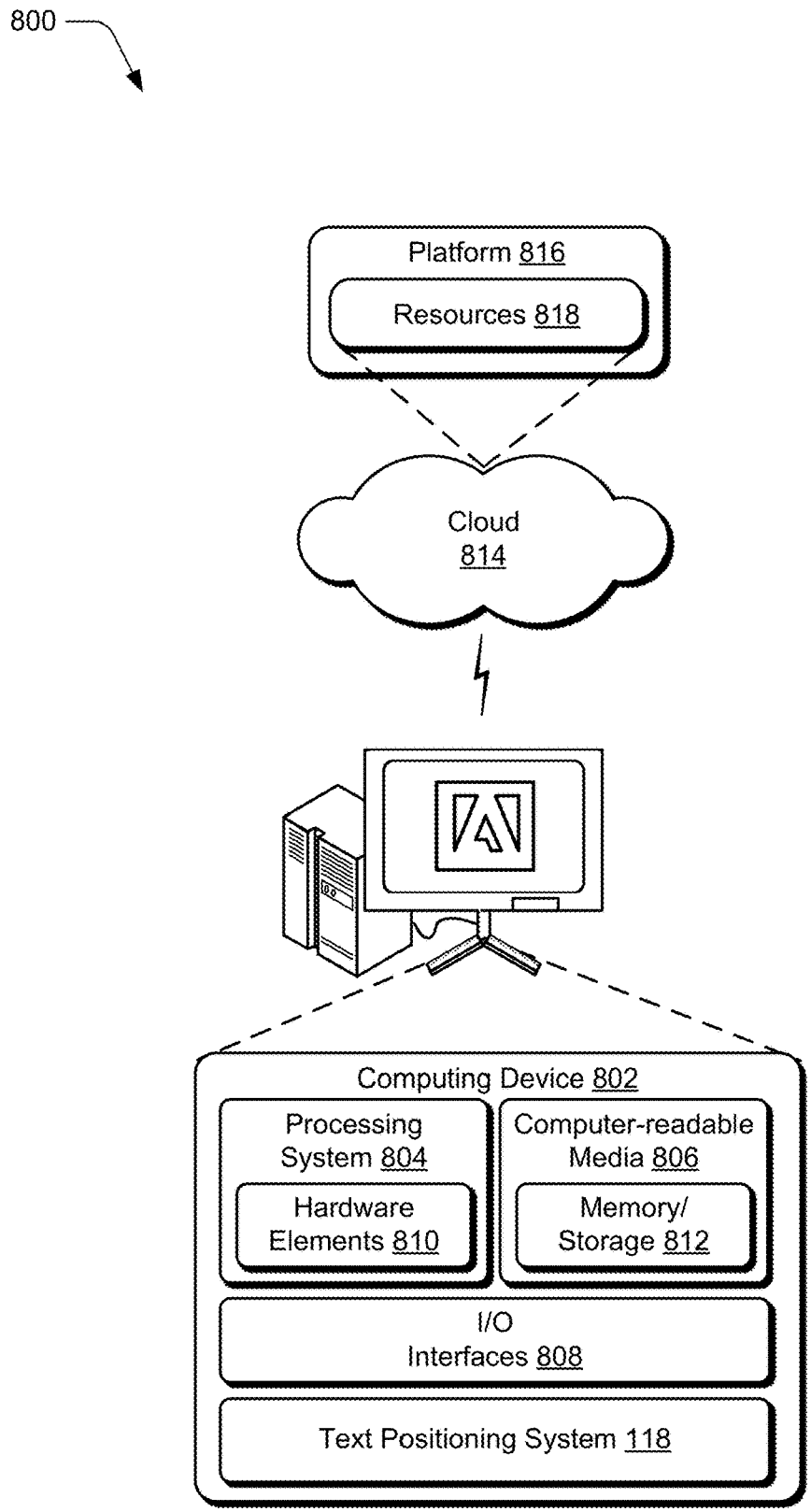
FIG. 8 illustrates an example system including various components of an example device that can be implemented as any type of computing device as described and/or utilized with reference to FIGS. 1-8 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the text positioning system 118. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

Conclusion

Although the subject matter has been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. In a digital medium environment, a method for automatically positioning textural content within a digital image, the method comprising:
obtaining, by at least one computing device, the digital image;
receiving, by the at least one computing device, user input to add textual content to the digital image, wherein the user input does not specify a position to place the textual content within the digital image;
identifying, by the at least one computing device, a salient portion and a non-salient portion within the digital image, wherein the salient portion within the digital image contains a salient object of the digital image, wherein the salient object is an object of primary focus in the digital image;
automatically determining, by the at least one computing device, a placement region for the textual content within the non-salient portion of the digital image by:
determining candidate placement regions within the non-salient portion of the digital image;
calculating a placement score for each of the candidate placement regions within the non-salient portion of the digital image, wherein the placement score is calculated for each of the candidate placement regions based on a size of the respective candidate placement region and a proximity of the respective candidate placement region to the salient object; and
selecting the placement region from the candidate placement regions based on the placement region having a highest calculated placement score of the candidate placement regions;
modifying, by the at least one computing device, the digital image by positioning the textual content within the automatically determined placement region and scaling the textual content to fit within the automatically determined placement region; and
outputting, by the at least one computing device, the modified digital image for display.

2. A method as described in claim 1, wherein the scaling the textual content to fit within the automatically determined placement region further comprises adjusting a font size of the textual content to fit within the automatically determined placement region.

3. A method as described in claim 1, wherein the scaling the textual content to fit within the placement region comprises at least one of:
adjusting a font size of the textual content;
adjusting a font type of the textual content;
adjusting spacing between individual characters of the textual content; or
aligning the textual content within the placement region.

4. A method as described in claim 1, wherein the modifying the digital image causes the textual content to be positioned within the placement region such that the salient object of the digital image is not obstructed by the textual content.

5. A method as described in claim 1, wherein the placement region corresponds to a non-centered portion of the digital image.

6. A method as described in claim 1, wherein the placement region for the textual content is automatically determined without receiving additional user input to specify a size or position of the textual content within the digital image.

7. The method as described in claim 1, further comprising:
receiving, by the at least one computing device, additional user input to add additional textual content to the digital image;

automatically determining, by the at least one computing device, an additional placement region for the additional textual content within the digital image; and modifying, by the at least one computing device, the digital image by positioning the textual content within the additional placement region while maintaining the textual content within the placement region of the digital image.

8. The method as described in claim 1, further comprising:

receiving, by the at least one computing device, additional user input to adjust a view of the modified digital image with the textual content;

identifying, by the at least one computing device, a new salient portion and a new non-salient portion of the adjusted digital image;

automatically determining, by the at least one computing device, a new placement region for the textual content within the new non-salient portion of the digital image; and modifying, by the at least one computing device, the adjusted digital image by repositioning the textual content within the new placement region of the new-salient portion of the adjusted digital image.

9. A text positioning system comprising:

an image saliency module implemented at least partially in hardware of at least one computing device to generate a saliency mask that defines a salient portion and a non-salient portion within a digital image, wherein the salient portion within the digital image contains a salient object of the digital image, wherein the salient object is an object of primary focus in the digital image;

a placement module implemented at least partially in hardware of the at least one computing device to determine candidate placement regions within the non-salient portion of the digital image based on the saliency mask;

a scoring module implemented at least partially in hardware of the at least one computing device to calculate a placement score for each of the candidate placement regions within the non-salient portion of the digital image, wherein the placement score is calculated for each of the candidate placement regions based on a size of the respective candidate placement region and a proximity of the respective candidate placement region to the salient object; and a mapping module implemented at least partially in hardware of the at least one computing device to select a placement region from the candidate placement regions based on the placement region having a highest calculated placement score of the candidate placement regions, and to modify the digital image by positioning textual content within the selected placement region and automatically scaling the textual content to fit within the selected placement region.

10. The system of claim 9, wherein the mapping module is further configured to automatically scale the textual content to fit within the selected placement region by adjusting a font size of the textual content.

11. The system of claim 9, wherein the mapping module is configured to automatically scale the textual content to fit within the placement region by:

adjusting a font size of the textual content;
adjusting a font type of the textual content;
adjusting spacing between individual characters of the textual content; or
aligning the textual content within the placement region.

12. The system of claim 9, wherein the mapping module modifies the digital image to cause the textual content to be positioned within the placement region such that the salient object of the digital image is not obstructed by the textual content.

13. The system of claim 9, wherein the placement region corresponds to a non-centered portion of the digital image.

14. The system of claim 9, wherein the placement region for the textual content is automatically selected without receiving additional user input to specify a size or position of the textual content within the digital image.

15. In a digital medium environment, a method for automatically positioning textual content within a digital image, the method comprising:

generating, by at least one computing device, a saliency mask that defines a salient portion and a non-salient portion within the digital image, wherein the salient portion within the digital image contains a salient object of the digital image, wherein the salient object is an object of primary focus in the digital image;

determining, by the at least one computing device, candidate placement regions within the non-salient portion of the digital image based on the saliency mask;

calculating, by the at least one computing device, a placement score for each of the candidate placement regions within the non-salient portion of the digital image, wherein the placement score is calculated for each of the candidate placement regions based on a size of the respective candidate placement region and a proximity of the respective candidate placement region to the salient object;

selecting, by the at least one computing device, a placement region from the candidate placement regions based on the placement region having a highest calculated placement score of the candidate placement regions; and modifying, by the at least one computing device, the digital image by positioning the textual content within the selected placement region and automatically scaling the textual content to fit within the selected placement region.

16. A method as described in claim 15, wherein the automatically scaling the textual content further comprises automatically adjusting a font size of the textual content to fit within the selected placement region.

17. A method as described in claim 16, wherein the automatically scaling the textual content further comprises automatically aligning the textual content to fit within the selected placement region.

18. A method as described in claim 1, wherein the non-salient portion within the digital image does not include the salient object.

19. A method as described in claim 15, wherein the placement region for the textual content is automatically selected without receiving additional user input to specify a size or position of the textual content within the digital image.

20. A method as described in claim 15, wherein the modifying the digital image causes the textual content to be positioned within the placement region such that the salient object of the digital image is not obstructed by the textual content.

* * * * *